US008180784B2

(12) United States Patent
Zhang et al.

(10) Patent No.: US 8,180,784 B2
(45) Date of Patent: May 15, 2012

(54) METHOD AND SYSTEM FOR IMPROVING PERFORMANCE OF COUNTING HITS IN A SEARCH

(75) Inventors: David Chen Zhang, Redwood City, CA (US); Jack Vinh Chung, San Leandro, CA (US)

(73) Assignee: Oracle International Corporation, Redwood Shores, CA (US)

( * ) Notice: Subject to any disclaimer, the term of this patent is extended or adjusted under 35 U.S.C. 154(b) by 871 days.

(21) Appl. No.: 10/402,727

(22) Filed: Mar. 28, 2003

(65) Prior Publication Data

US 2009/0094218 A1 Apr. 9, 2009

(51) Int. Cl.
*G06F 7/00* (2006.01)
*G06F 17/30* (2006.01)

(52) U.S. Cl. ......... 707/759; 707/736; 707/754; 707/765

(58) Field of Classification Search .................. 707/2–5, 707/102, 736, 754, 759, 765
See application file for complete search history.

(56) References Cited

U.S. PATENT DOCUMENTS

| 5,500,920 | A | * | 3/1996 | Kupiec | 704/270.1 |
|---|---|---|---|---|---|
| 6,052,693 | A | * | 4/2000 | Smith et al. | 707/104.1 |
| 6,263,328 | B1 | * | 7/2001 | Coden et al. | 707/3 |
| 6,363,377 | B1 | * | 3/2002 | Kravets et al. | 707/4 |
| 6,598,044 | B1 | * | 7/2003 | Waas et al. | 707/3 |
| 6,804,662 | B1 | * | 10/2004 | Annau et al. | 707/2 |
| 6,829,606 | B2 | * | 12/2004 | Ripley | 707/5 |
| 7,461,077 | B1 | * | 12/2008 | Greenwood | 707/102 |
| 2002/0026342 | A1 | * | 2/2002 | Lane et al. | 705/8 |

* cited by examiner

*Primary Examiner* — Apu Mofiz
*Assistant Examiner* — Chelcie Daye
(74) *Attorney, Agent, or Firm* — Kilpatrick Townsend & Stockton LLP

(57) ABSTRACT

One embodiment of the present invention includes a method for automatically enabling a search system or application to quickly and accurately count hits corresponding to a search expression. For example, a search expression is received or retrieved that may include redundant and/or overlapping search expression components. Each narrow search expression component is removed from the search expression if joined by an "OR" operator to a broader or equivalent search expression component. Additionally, each broad search expression component is removed from the search expression if joined by an "AND" operator to a narrower or equivalent search expression component. By modifying the received search expression in this fashion, a performance gain is typically achieved for calculating the hit count while maintaining its accuracy.

30 Claims, 4 Drawing Sheets

METHOD AND SYSTEM FOR IMPROVING PERFORMANCE OF COUNTING HITS IN A SEARCH

BACKGROUND

Computers have become integral tools used in a wide variety of different applications, such as in finance and commercial transactions, computer-aided design and manufacturing, health care, telecommunication, education, etc. Computers are finding new applications as a result of advances in hardware technology and rapid development in software technology. Furthermore, the functionality of a computer system is dramatically enhanced by coupling these types of stand-alone devices together in order to form a networking environment. Within a networking environment, computer users may readily exchange files, share information stored on a common database, pool resources, and communicate via electronic mail (e-mail) and video teleconferencing.

It is appreciated that a wide variety of different types of information and data can be stored by a commonly shared database. Additionally, databases can store very large amounts of data (e.g., many terabytes). One conventional approach for users to retrieve data associated with a database is to utilize a database searching application such as SQL (structured query language). However, there are disadvantages associated with these type of database searching applications.

For example, in order to provide a full count of items within the database that a user may be interested in, the conventional database searching application typically takes some time to eventually produce the desired results. It is noted that the time spent determining the count is based on the size of the database. Therefore, as the size of the database increases, the length of the conventional way of determining the exact number of one or more search items within the database takes longer to perform. To overcome the cost of counting accurately, conventional systems adopt heuristics to estimate the count. However, this conventional estimation technique is not advantageous when an accurate search count is desired by a user.

The present invention may address one or more of the above issues.

SUMMARY

One embodiment of the present invention includes a method for automatically enabling a search system or application to quickly and accurately count hits corresponding to a search expression. For example, a search expression is received or retrieved that may include redundant and/or overlapping search expression components. The search expression typically consists of a number of search conditions that are combined using "AND" and "OR" operators, which can be modified and/or simplified in the following manner. Each narrow search expression component is removed from the search expression if joined by an "OR" operator to a broader or equivalent search expression component. Additionally, each broad search expression component is removed from the search expression if joined by an "AND" operator to a narrower or equivalent search expression component. By modifying the received search expression in this fashion, a performance gain is typically achieved for calculating the hit count while maintaining its accuracy.

In another embodiment, the present invention provides a method for improving performance of counting hits in a search. The method includes receiving a search expression. The method also includes removing a first search expression component from the search expression provided the first search expression component is joined by an "OR" operator to a broader or equivalent search expression component of the search expression. Furthermore, the method includes removing the first search expression component from the search expression provided the first search expression component is joined by an "AND" operator to a narrower or equivalent search expression component.

In yet another embodiment, the present invention provides a computer system. The computer system includes a processor and a data bus coupled to the processor. Additionally, the computer system includes a memory device coupled to communicate with the processor for performing operations. For example, the operations can include receiving a search expression. Furthermore, the operations can include deleting a first search expression component from the search expression provided the first search expression component is joined by an "OR" operator to a broader or equivalent search expression component of the search expression. Moreover, the operations can include deleting the first search expression component from the search expression provided the first search expression component is joined by an "AND" operator to a narrower or equivalent search expression component of the search expression.

In still another embodiment, the present invention provides a computer readable medium having computer readable code embodied therein for causing a computer system to perform operations. For example, the computer readable code may cause the computer system to receive an expanded search query. The computer readable code may cause the computer system to also delete a first search expression component from the expanded search query provided the first search expression component is joined by an "OR" operator to a broader or equivalent search expression component of the expanded search query. Additionally, The computer readable code may cause the computer system to delete the first search expression component from the expanded search query provided the first search expression component is joined by an "AND" operator to a narrower or equivalent search expression component.

While particular embodiments of the present invention have been specifically described within this summary, it is noted that the invention is not limited to these embodiments. The invention is intended to cover alternatives, modifications and equivalents which may be included within the scope of the invention as defined by the Claims.

DESCRIPTION OF PREFERRED EMBODIMENTS

Figure 1:
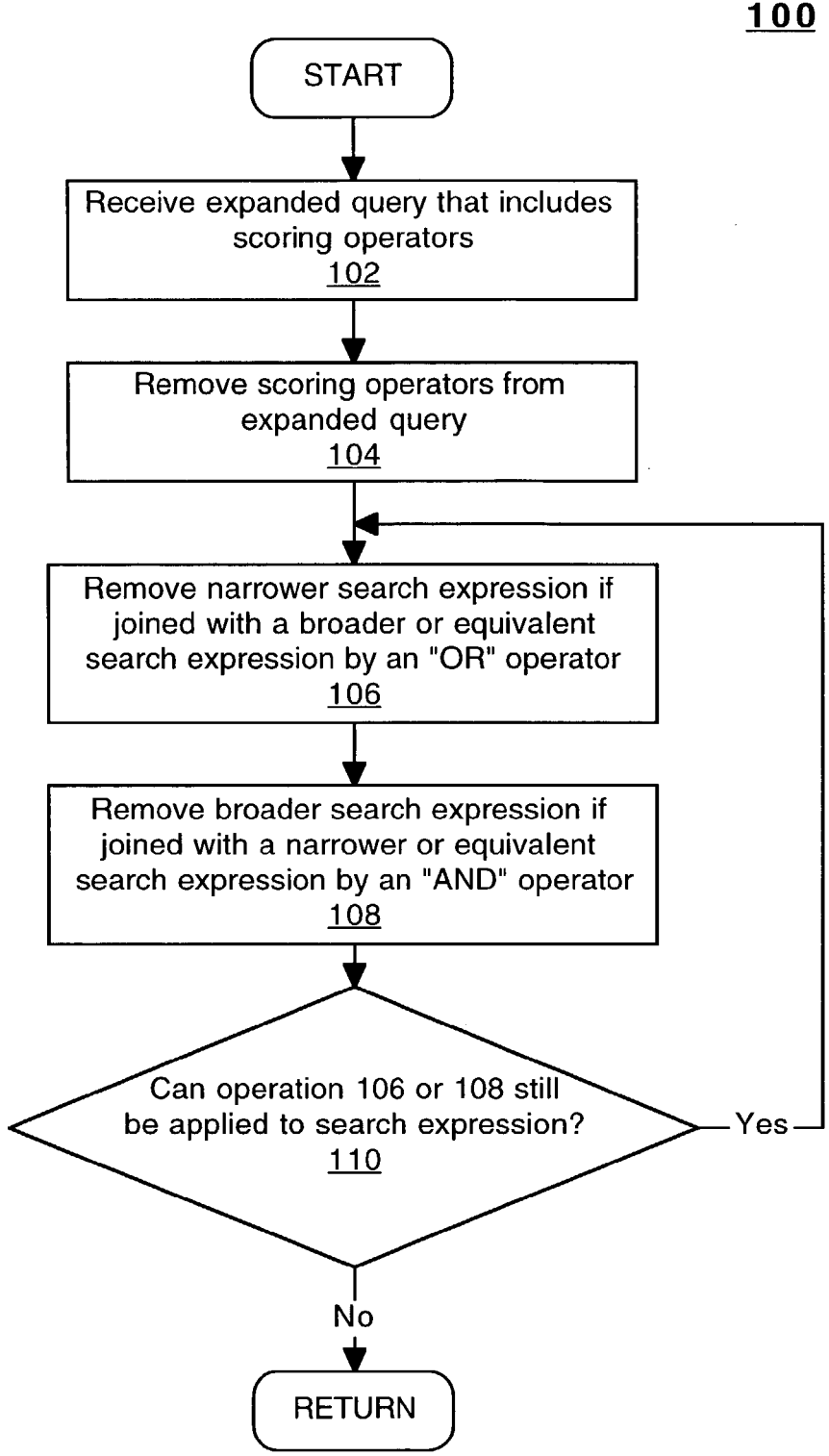
FIG. 1 is a flowchart of operations performed in accordance with an embodiment of the present invention for enabling a search application to quickly and accurately count hits.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps may involve physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "deleting", "determining", "activating", "enabling", "controlling", "transmitting", "receiving", "recognizing", "generating", "removing", "utilizing", "storing" or the like, refer to the action and processes of a computing system, or similar electronic computing device, that manipulates and transforms data. The data is represented as physical (electronic) quantities within the computing system's registers and memories and is transformed into other data similarly represented as physical quantities within the computing system's memories or registers or other such information storage, transmission, or display devices.

FIG. 1 is a flowchart 100 of operations performed in accordance with an embodiment of the present invention for enabling a search application to quickly and accurately count hits. Flowchart 100 includes processes of the present invention which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in flowchart 100, such operations are exemplary. That is, the present embodiment is well suited to performing various other operations or variations of the operations recited in FIG. 1. Within the present embodiment, it should be appreciated that the operations of flowchart 100 may be performed by software, by hardware or by any combination of software and hardware.

The present embodiment provides a method for automatically enabling a search system or application to quickly and accurately count hits corresponding to an expanded query string (e.g., for a full-text search, a database search, etc.). For example, an expanded query string (or expanded search expression) is received that includes one or more scoring operators. It is appreciated that the expanded query string may have been generated by a conventional search application from an inputted query string. Additionally, the scoring operators are usually implemented as part of a conventional search to determine the ranking relevance of each found item. As such, within the present embodiment, any scoring operators are eliminated from the received query string expansion thereby resulting in a search expression. The search expression is further modified and/or simplified in the following manner. Each narrow search expression component is removed from the search expression if joined by an "OR" operator to a broader or equivalent search expression component. Moreover, each broad search expression component is removed from the search expression if joined by an "AND" operator to a narrower or equivalent search expression component. By modifying the received query string expansion in this fashion, a performance gain is typically achieved by a search application (or system) using the resultant search expression for calculating the hit count while maintaining its accuracy.

At operation 102 of FIG. 1, an expanded query string (or expanded search expression) is received or retrieved that includes one or more scoring operators. It is noted that the expanded query string may be received or retrieved from a conventional search system or application, e.g., SQL (structured query language), Google™ search engine, and the like, that a user may utilize to search a database of information, the Internet, etc. Furthermore, the query string expansion may be produced by the conventional search system based on search information (e.g., query string) input by a user. The search system may perform searches such as, but not limited to, a full-text search or a database search. Moreover, the scoring operators associated with the expanded query are typically for determining a relevance ranking of (or sorting) documents, files, information and/or items found during a search. For example, if the original search information was "hello world", before beginning the search the conventional search system can generate the expanded search query by including one or more scoring operators that enable the searching system to determine the relevant rank of each found item. More specifically, the expanded query may include a first operator that returns a document count that includes the phrase "hello world", a second operator that returns a document count that includes "hello" and "world" near each other (but not in any specific order), and a third operator that returns a document count that includes either "hello" or "world". It is noted that the first, second and third operators may each be joined together by an "OR" operator, as shown in the following exemplary expression:

({hello world})*2 OR ({hello} near {world})*2 OR ({hello} OR {world}).

It is understood that the "*2" of the above exemplary expression is a scoring or ranking operator that increases the score or rank of each found item associated with this notation.

At operation 104, any scoring operators associated with the received query expansion are removed (or deleted) from it thereby resulting in a search expression. In this manner, any type of ranking relevance or sorting is removed to enable quick and accurate determination of the hit count associated with the expanded query. Specifically, scoring operators can be computationally intensive thereby impeding the determination speed of the search hit count. At operation 104, the previous exemplary expression can be converted into the following exemplary expression:

{hello world} OR ({hello} near {world}) OR ({hello} OR {world}).

At operation 106 of FIG. 1, if applicable, each narrow search expression component is removed (or deleted) from the search expression if joined with a broader or equivalent search expression component by an "OR" operator. For example, given the exemplary search expression that may be produced at operation 104:

{hello world} OR ({hello} near {world}) OR ({hello} OR {world}), the {hello world} search expression component can be removed at operation 106 since it is joined by an "OR" operator with ({hello} near {world}). ({hello} near {world}) is a broader search expression compared to {hello world} since any hit that has the phrase "hello world" by definition has the words "hello" and "world" near each other. Similarly, since the remaining expression component ({hello} near {world}) is narrower than ({hello} OR {world}) and they are joined by an "OR" operator, the expression component ({hello} near {world}) can be removed at operation 106. Therefore, operation 106 may produce the following exemplary search expression:

{hello} OR {world}.

It is noted that if operation 106 does not apply to the search expression produced at operation 104, the process can skip operation 106 and proceed to operation 108.

At operation 108, if applicable, each broad search expression component is removed (or deleted) from the search expression if joined with a narrower or equivalent search expression component by an "AND" operator. For example, the following exemplary search expression may have been produced at operation 104:

({hello} near {world}) AND ({hello} OR {world}).

Since the ({hello} OR {world}) expression component is broader than the expression component ({hello} near {world}) and they are joined by an "AND" operator, the ({hello} OR {world}) is removed at operation 108 resulting in the following exemplary search expression:

({hello} near {world}).

This exemplary search expression that may be produced at operation 108 can be significantly faster to execute by a search application for determining the hit count than the expanded query received or retrieved at operation 102 that included one or more scoring operators. It is noted that if operation 108 does not apply to the search expression produced at operations 104 and/or 106, the process can skip operation 108 and proceed to operation 110.

At operation 110 of FIG. 1, a determination is made as to whether operation 106 or 108 can still be applied to the current search expression. If not, the process exits flowchart 100. However, if it is determined at operation 110 that operation 106 or 108 can still be applied to the search expression, the process proceeds to the beginning of operation 106. In this manner, operations 106 and/or 108 can be repeatedly applied to the search expression until no further modifications can be made to it.

It is noted that the resultant search expression produced by process 100 can be executed by a search application (or system) to accurately count hits corresponding to the expanded query received or retrieved at operation 102. Additionally, it is understood that the resultant search expression produced by process 100 can be significantly faster to execute for determining the hit count than the expanded query received or retrieved at operation 102. Therefore, process 100 can enable a performance gain for calculating the count hit of a search while maintaining its accuracy.

It is appreciated that operations 106 and 108 can be applied to search expression components besides the "phrase" component, the "near" component and the "or" component shown in the previous examples. For any two search expression components, one expression component is either broader than the other, narrower than the other, equivalent to the other, or none of the above. Accordingly, depending on the operator joining the two search expression components, either operation 106 or 108 can be applied, or no operation may be applied.

The operations of flowchart 100 may be performed in an order different than that shown within FIG. 1. For example, operation 108 may be performed before operation 106. It is noted that if a query expansion is received or retrieved at operation 102 that is a single word search (e.g., "hello"), flowchart 100 may not be able to improve the performance of calculating the hit count. However, the performance benefit provided by flowchart 100 becomes increasingly better as the received or retrieved query expansion becomes more complicated.

Figure 2:
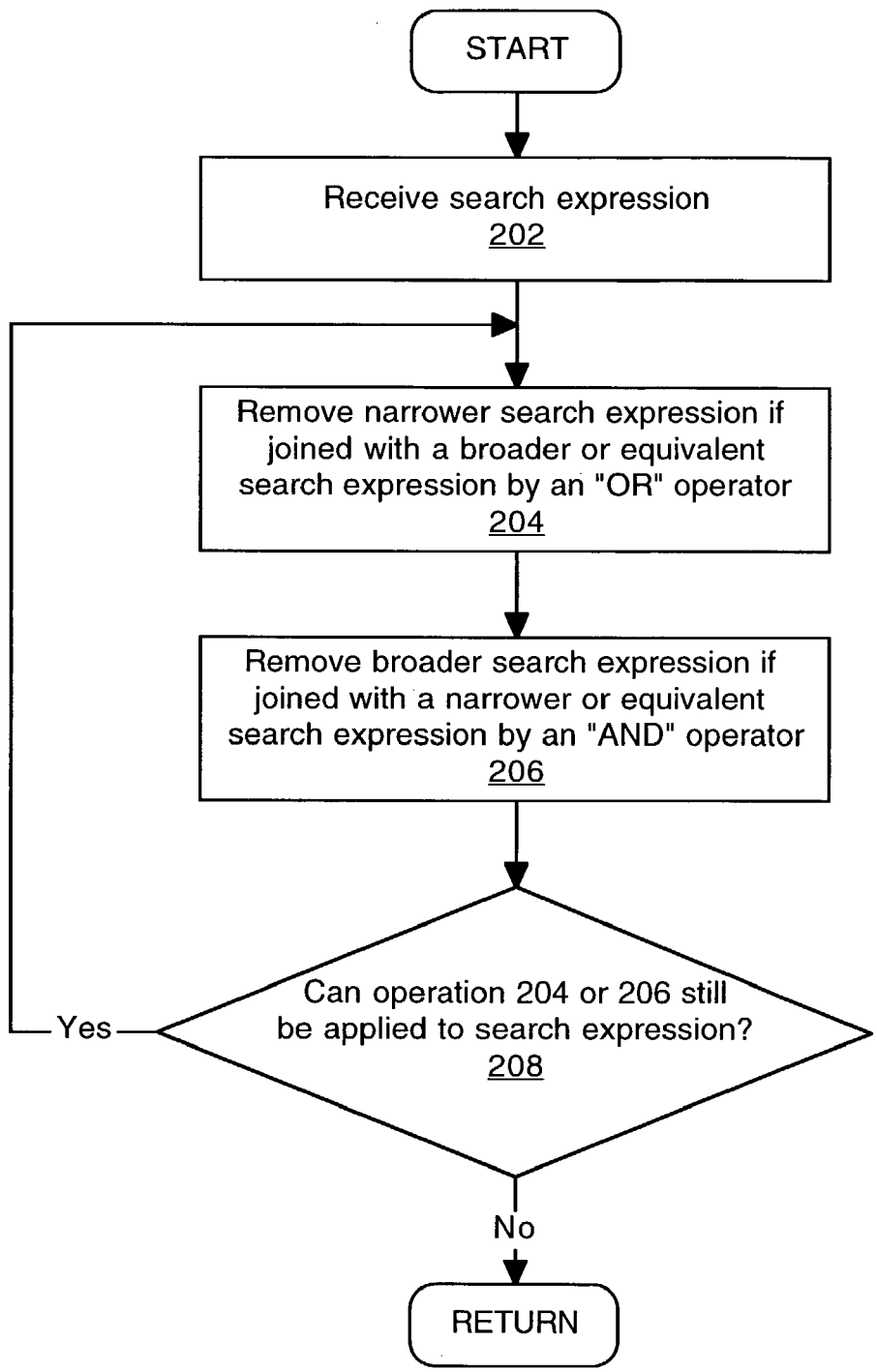
FIG. 2 is a flowchart of operations performed in accordance with another embodiment of the present invention for enabling a search application to quickly and accurately count hits.

FIG. 2 is a flowchart 200 of operations performed in accordance with an embodiment of the present invention for enabling a search application to quickly and accurately count hits. Flowchart 200 includes processes of the present invention which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific operations are disclosed in flowchart 200, such operations are exemplary. That is, the present embodiment is well suited to performing various other operations or variations of the operations recited in FIG. 2. Within the present embodiment, it should be appreciated that the operations of flowchart 200 may be performed by software, by hardware or by any combination of software and hardware.

The present embodiment provides a method for automatically enabling a search system or application to quickly and accurately count hits corresponding to a search expression (e.g., for a full-text search, a database search, etc.) that does not include scoring or ranking operators. For example, a search expression is received or retrieved that may include redundant and/or overlapping search expression components. The search expression is modified and simplified in the following manner. Each narrow search expression component is removed from the search expression if joined by an "OR" operator to a broader or equivalent search expression component. Additionally, each broad search expression component is removed from the search expression if joined by an "AND" operator to a narrower or equivalent search expression component. By modifying the received search expression in this fashion, a performance gain is typically achieved by a search application (or system) using the resultant search expression for calculating the hit count while maintaining its accuracy.

At operation 202 of FIG. 2, a search expression is received or retrieved. It is noted that the search expression may be received or retrieved from a conventional search system or application (e.g., SQL, Google™ search engine, and the like) that a user may utilize to search a database of information, the Internet, etc. Furthermore, the search expression may be produced by the conventional search system based on search information and functions input by a user. The search system may perform searches such as, but not limited to, a full-text search or a database search. Moreover, the search expression may include redundant and/or overlapping search expression components. More specifically, the search expression may include a first operator that returns a document count that includes either "hello" or "world" or "goodbye", a second operator that returns a document count that includes the phrase "hello world", and a third operator that returns a document count that includes "wide" and "web". It is noted that the first and second operators are joined by an "AND" operator while the second and third operators are joined by an "OR" operator, as shown in the following exemplary expression:

({hello} OR {world} OR {goodbye}) AND {hello world} OR ({wide} AND {web}).

At operation 204, if applicable, each narrow search expression component is removed (or deleted) from the search expression if joined with a broader or equivalent search expression component by an OR operator. For example, given the exemplary search expression that may be received or retrieved at operation 202:

({hello} OR {world} OR {goodbye}) AND {hello world} OR ({wide} AND {web}), operation 204 does not apply. Specifically, since the {hello world} search expression component is neither a broader nor a narrower search expression component compared to ({wide} AND {web}), operation 204 does not apply to the exemplary search expression. As such, the process can skip operation 204 and proceed to operation 206. It is noted that operation 204 of FIG. 2 may operate in a manner similar to that described herein with reference to operation 106 of FIG. 1.

At operation 206 of FIG. 2, if applicable, each broad search expression component is removed from the search expression if joined with a narrower or equivalent search expression component by an "AND" operator. For example, the following exemplary search expression may have been received at operation 202 or produced at operation 204:

({hello} OR {world} OR {goodbye}) AND {hello world} OR ({wide} AND {web}).

Since the ({hello} OR {world} OR {goodbye}) expression component is broader than the expression component {hello world} and they are joined by an "AND" operator, the ({hello} OR {world} OR {goodbye}) is removed at operation 206 resulting in the following exemplary search expression:

{hello world} OR ({wide} AND {web}).

This exemplary search expression that may be produced at operation 206 can be significantly quicker to execute by a search application (or system) for calculating the hit count than the exemplary search expression received or retrieved at operation 202. It is noted that if operation 206 does not apply to the search expression produced at operations 202 and/or 204, the process can skip operation 206 and proceed to operation 208.

At operation 208, a determination is made as to whether operation 204 or 206 can still be applied to the current search expression. If not, the process exits flowchart 200. However, if it is determined at operation 208 that operation 204 or 206 can be applied to the search expression, the process proceeds to the beginning of operation 204. In this manner, operations 204 and/or 206 can be repeatedly applied to the search expression until no future modifications can be made to it.

It is noted that the resultant search expression produced by process 200 can be executed by a search application (or system) to accurately count hits corresponding to the search expression received or retrieved at operation 202. Additionally, it is understood that the resultant search expression produced by process 200 can be significantly faster to execute for determining the hit count than the original search expression received or retrieved at operation 202. As such, process 200 can enable a performance gain for calculating the count hit of a search while maintaining its accuracy.

Within FIG. 2, it is appreciated that operations 204 and 206 can be applied to search expression components besides the "phrase" component, the "near" component, the "or" component, and the "and" component shown herein. For any two search expression components, one expression component is either broader than the other, narrower than the other, equivalent to the other, or none of the above. Accordingly, depending on the operator joining the two expression components, either operation 204 or 206 can be applied, or no operation may be applied.

It is appreciated that operations of flowchart 200 may be performed in an order different than that shown within FIG. 2. For example, operation 206 may be performed before operation 204. It is noted that if a search expression is received or retrieved at operation 202 that is a single word search, flowchart 200 may not be able to improve the performance of calculating the hit count. However, the performance benefit provided by flowchart 200 becomes increasingly advantageous as the received or retrieved search expression becomes more complicated.

Figure 3:
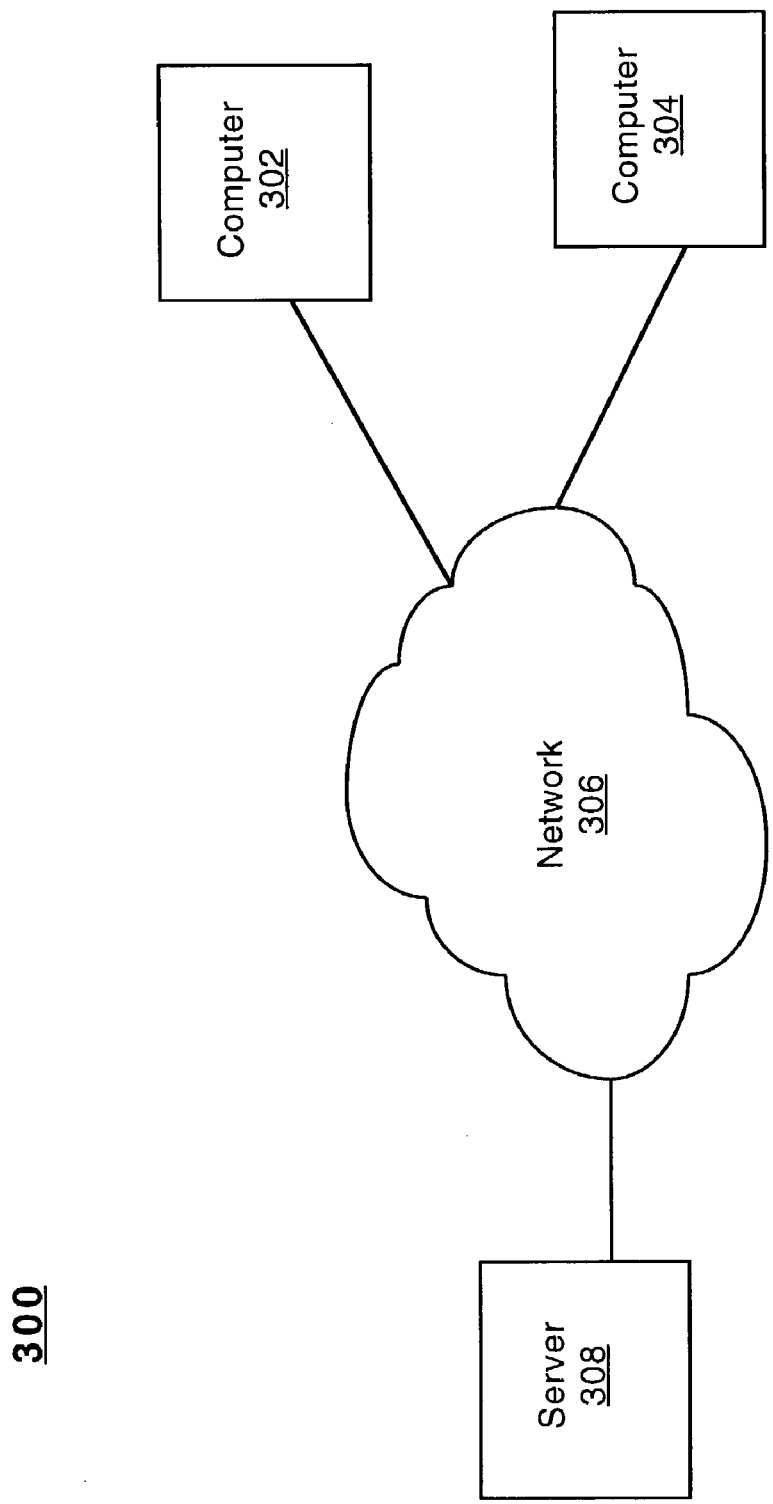
FIG. 3 is a block diagram of an exemplary network that may be utilized in accordance with embodiments of the present invention.

FIG. 3 is a block diagram of an exemplary network 300 that may be utilized in accordance with embodiments of the present invention. For example, computers 302 and 304 may each be utilized to submit a database search query to a server 308 via a network 306. It is understood that this information may enable server 308 to perform in accordance with an embodiment (e.g., flowchart 100 or flowchart 200) of the present invention.

Within networking environment 300, server 308 and computers 302 and 304 may be coupled in order to communicate. Specifically, server 308 and computers 302 and 304 are communicatively coupled to network 306. It is appreciated that server 308 and computers 302 and 304 may each be communicatively coupled to network 306 via wired and/or wireless communication technologies.

The network 306 of networking environment 300 may be implemented in a wide variety of ways in accordance with the present embodiment. For example, network 306 may be implemented as, but is not limited to, a local area network (LAN), a metropolitan area network (MAN), a wide area network (WAN) and/or the Internet. It is noted that networking environment 300 is well suited to be implemented without network 306. As such, server 308 and computers 302 and 304 may be communicatively coupled via wired and/or wireless communication technologies.

Within FIG. 3, it is understood that networking environment 300 may be implemented to include more or less computers than the two computers (e.g., 302 and 304) shown. Additionally, networking environment 300 may be implemented to include more server devices than the one server device (e.g., 308) shown. It is noted that server 308 and computers 302 and 304 may each be implemented in a manner similar to a computer system 400 of FIG. 4 described herein. However, these devices of networking environment 300 are not in any way limited to such an implementation.

Figure 4:
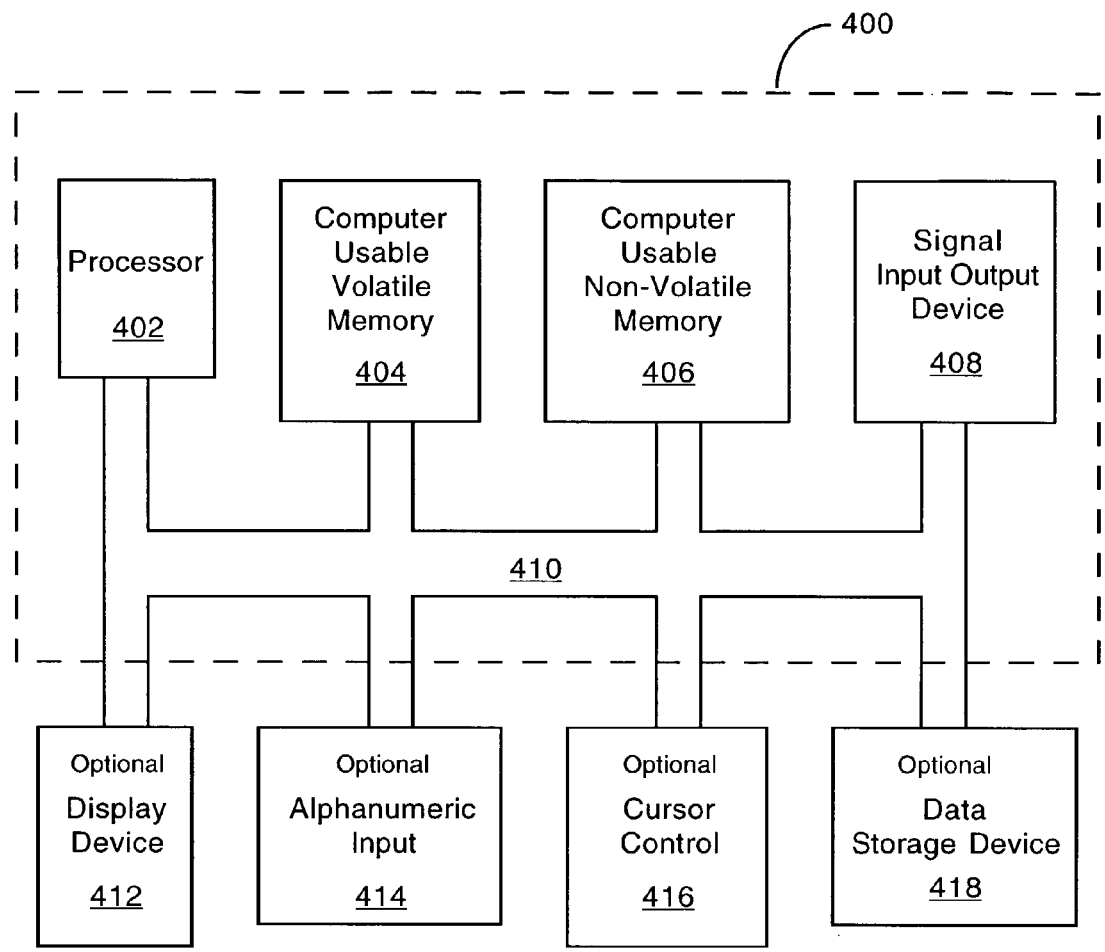
FIG. 4 is a block diagram of an exemplary computer system that may be used in accordance with embodiments of the present invention.

FIG. 4 is a block diagram of an exemplary computer system 400 that may be used in accordance with embodiments of the present invention. It is understood that system 400 is not strictly limited to be a computer system. As such, system 400 of the present embodiment is well suited to be any type of computing device (e.g., server computer, desktop computer, laptop computer, portable computing device, etc.). Within the discussions of the present invention herein, certain processes and operations were discussed that may be realized, in some embodiments, as a series of instructions (e.g., software program) that reside within computer readable memory units of computer system 400 and executed by a processor(s) of system 400. When executed, the instructions cause computer 400 to perform specific operations and exhibit specific behavior which are described herein.

Computer system 400 comprises an address/data bus 410 for communicating information, one or more central processors 402 coupled with bus 410 for processing information and instructions. Central processor unit(s) 402 may be a microprocessor or any other type of processor. The computer 400 also includes data storage features such as computer usable volatile memory 404, e.g., random access memory (RAM), static RAM, dynamic RAM, etc., coupled with bus 410 for storing information and instructions for central processor(s) 402, computer usable non-volatile memory 406, e.g., read only memory (ROM), programmable ROM, flash memory, erasable programmable read only memory (EPROM), electrically erasable programmable read only memory (EEPROM), etc., coupled with bus 410 for storing static information and instructions for processor(s) 402.

System 400 of FIG. 4 also includes one or more signal generating and receiving devices 408 coupled with bus 410 for enabling system 400 to interface with other electronic devices. The communication interface(s) 408 of the present embodiment may include wired and/or wireless communication technology. For example, in one embodiment of the present invention, the communication interface 408 is a serial communication port, but could also alternatively be any of a number of well known communication standards and protocols, e.g., a Universal Serial Bus (USB), an Ethernet adapter, FireWire® (IEEE 1394) interface, a parallel port, a small computer system interface (SCSI) bus interface, an infrared (IR) communication port, a Bluetooth® wireless communication adapter, a broadband connection, and the like. In another embodiment, a cable or digital subscriber line (DSL) connection may be employed. In such a case the communication interface(s) 408 may include a cable modem or a DSL modem. Additionally, the communication interface(s) 408 may provide a communication interface to the Internet.

Optionally, computer system 400 can include an alphanumeric input device 414 including alphanumeric and function keys coupled to the bus 410 for communicating information and command selections to the central processor(s) 402. The computer 400 can also include an optional cursor control or cursor directing device 416 coupled to the bus 410 for communicating user input information and command selections to the processor(s) 402. The cursor directing device 416 can be implemented using a number of well known devices such as a mouse, a track ball, a track pad, an optical tracking device, a touch screen, etc. Alternatively, it is appreciated that a cursor can be directed and/or activated via input from the alphanumeric input device 414 using special keys and key sequence commands. The present embodiment is also well suited to directing a cursor by other means such as, for example, voice commands.

The system 400 of FIG. 4 can also include an optional computer usable mass data storage device 418 such as a magnetic or optical disk and disk drive (e.g., hard drive or floppy diskette) coupled with bus 410 for storing information and instructions. An optional display device 412 is coupled to bus 410 of system 400 for displaying video and/or graphics. It should be appreciated that optional display device 412 may be a cathode ray tube (CRT), flat panel liquid crystal display (LCD), field emission display (FED), plasma display or any other display device suitable for displaying video and/or graphic images and alphanumeric characters recognizable to a user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method comprising:

receiving an initial search expression generated by a search application, said initial search expression comprising a plurality of components linked by operators;

creating, before any search is performed corresponding to said initial search expression, a modified search expression based upon said initial search expression such that execution of said modified search expression yields the same number of results as would result from execution of said initial search expression, wherein said creating comprises:

when a first component and a second component of said initial search expression are joined by an "OR" operator, including the narrower of said first component and said second component in said modified search expression; and when a first component and a second component of said initial search expression are joined by an "AND" operator, including the broader of said first component and said second component in said modified search expression, wherein said modified search expression only includes components from said initial search expression, the number of components in said modified search expression is less than the number of components in said initial search expression, and the number of operators in said modified search expression is less than the number of operators in said initial search expression; and executing a search with said modified search expression.

2. The computer-implemented method as described in claim 1, further comprising:

before any search is performed corresponding to said search expression, removing a ranking operator from said initial search expression.

3. The computer-implemented method as described in claim 1, wherein said initial search expression is based on an input query string.

4. The computer-implemented method as described in claim 1, wherein said initial search expression comprises an operator that returns a document count that includes a phrase.

5. The computer-implemented method as described in claim 1, wherein said initial search expression comprises an operator that returns a document count that includes either a first word or a second word.

6. The computer-implemented method as described in claim 1, wherein said initial search expression comprises an operator that returns a document count that includes a first word and a second word.

7. The computer-implemented method as described in claim 6, wherein said initial search expression further comprises an operator that returns a document count that includes a phrase.

8. The computer-implemented method as described in claim 1, wherein said executing a search with said modified search expression is executed by a second search application.

9. A computer system comprising:
a processor;
a data bus coupled to said processor; and
a memory device coupled to communicate with said processor for performing a method comprising:
receiving an initial search expression generated by a search application, said initial search expression comprising a plurality of components linked by operators;
creating, before any search is performed corresponding to said initial search expression, a modified search expression based upon said initial search expression such that execution of said modified search expression yields the same number of results as would result from execution of said initial search expression, wherein said creating comprises:
when a first component and a second component of said initial search expression are joined by an "OR" operator, including the narrower of said first component and said second component in said modified search expression; and
when a first component and a second component of said initial search expression are joined by an "AND" operator, including the broader of said first component and said second component in said modified search expression,
wherein said modified search expression only includes components from said initial search expression, the number of components in said modified search expression is less than the number of components in said initial search expression, and the number of operators in said modified search expression is less than the number of operators in said initial search expression; and
executing a search with said modified search expression.

10. The computer system of claim 9, further comprising:
before any search is performed corresponding to said initial search expression, removing a ranking operator from said initial search expression.

11. The computer system of claim 10, wherein said initial search expression is based on an input query string.

12. The computer system of claim 11, wherein said initial search expression comprises an operator that returns a document count that includes a phrase.

13. The computer system of claim 11, wherein said initial search expression comprises an operator that returns a document count that includes either a first word or a second word.

14. The computer system of claim 11, wherein said initial search expression comprises an operator that returns a document count that includes a first word and a second word.

15. The computer system of claim 11, wherein said input query string was submitted to said computer system by a second computer.

16. The computer system of claim 9, wherein said computer system is a server coupled to a network.

17. A computer readable storage medium having computer readable code embodied therein for causing a computer system to perform a method comprising:
receiving an initial search query generated by a search application, wherein said initial search query is based on an input query string, said initial search query comprising a plurality of components linked by operators;
creating, before any search is performed corresponding to said initial search query, a modified search query based upon said initial search query such that execution of said modified search query yields the same number of results as would result from execution of said initial search query, wherein said creating comprises:
when a first component and a second component of said initial search query are joined by an "OR" operator, including the narrower of said first component and said second component in said modified search query; and
when a first component and a second component of said initial search query are joined by an "AND" operator, including the broader of said first component and said second component in said modified search query;
wherein said modified search query only includes components from said initial search query, the number of components in said modified search query is less than the number of components in said initial search query, and the number of operators in said modified search query is less than the number of operators in said initial search query; and
executing a search with said modified search query.

18. The computer readable storage medium of claim 17, said method further comprising:
before any search is performed corresponding to said initial search query, removing a ranking operator from said initial search query, thereby modifying said initial search query.

19. The computer readable storage medium of claim 17, wherein said initial search query comprises an operator that returns a document count that includes a phrase.

20. The computer readable storage medium of claim 17, wherein said initial search query comprises an operator that returns a document count that includes either a first word or a second word.

21. The computer readable storage medium of claim 17, wherein said initial search query comprises an operator that returns a document count that includes a first word and a second word.

22. The computer readable storage medium of claim 21, wherein said initial search query further comprises an operator that returns a document count that includes either a first word or a second word.

23. The computer readable storage medium of claim 22, wherein said initial search query string comprises an operator that returns a document count that includes a phrase.

24. The computer-implemented method as described in claim 1, wherein said modified search expression executes faster than said initial search expression when executed by said search application, to provide a performance benefit.

25. The computer-implemented method as described in claim 24, wherein a degree of said performance benefit is proportional to the complexity of said initial search expression.

26. The computer-implemented method as described in claim 1, further comprising automatically identifying said components in said initial search expression and said operators, wherein said components are separated in said initial search expression by said operators.

27. The computer-implemented method as described in claim 1, further comprising automatically identifying said components and said operators in said initial search expression, wherein said components comprise words separated by said operators.

28. The computer-implemented method as described in claim 1, wherein said operators comprise Boolean operators.

29. The computer-implemented method as described in claim 1, wherein said components comprise words.

30. The computer-implemented method as described in claim 1, wherein said modified search expression only includes words and operators from said initial search expression.

* * * * *

UNITED STATES PATENT AND TRADEMARK OFFICE
CERTIFICATE OF CORRECTION

| | |
|---|---|
| PATENT NO. | : 8,180,784 B2 |
| APPLICATION NO. | : 10/402727 |
| DATED | : May 15, 2012 |
| INVENTOR(S) | : Zhang et al. |

It is certified that error appears in the above-identified patent and that said Letters Patent is hereby corrected as shown below:

In column 9, line 50, delete "adapter," and insert -- adapter, a --, therefor.

Signed and Sealed this
Thirty-first Day of July, 2012

David J. Kappos
*Director of the United States Patent and Trademark Office*